(No Model.) 3 Sheets—Sheet 1.
H. SEE.
VALVE GEAR.
No. 263,818. Patented Sept. 5, 1882.
FIG. 2.
FIG. 1.
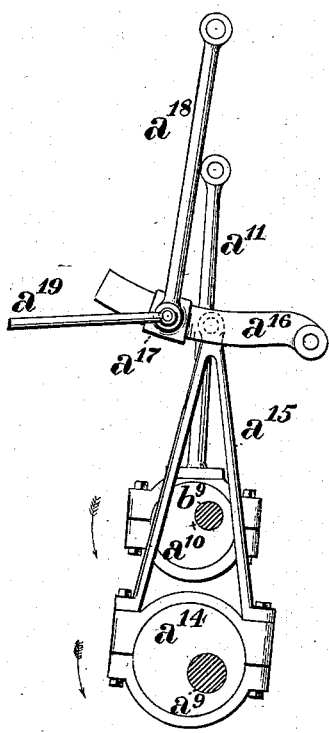
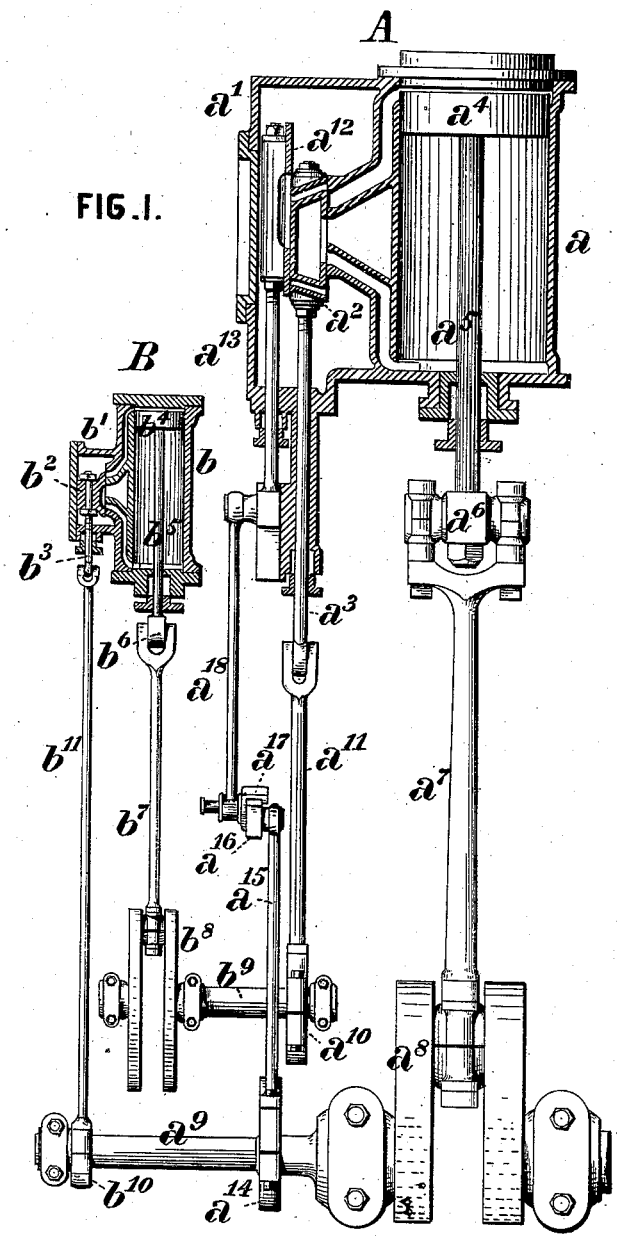
WITNESSES:
N. H. Culver
Geo. J. Kelly
INVENTOR
Horace See,
by Collier & Bell,
Attys.

(No Model.) 3 Sheets—Sheet 2.
H. SEE.
VALVE GEAR.
No. 263,818. Patented Sept. 5, 1882.
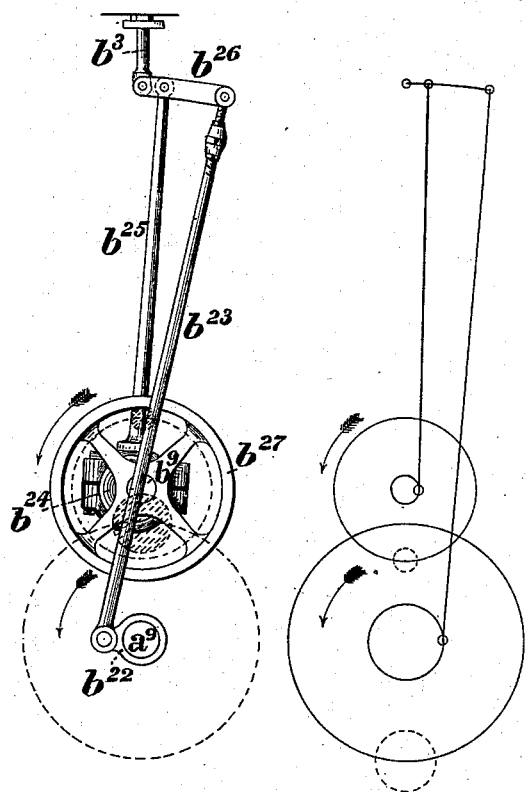
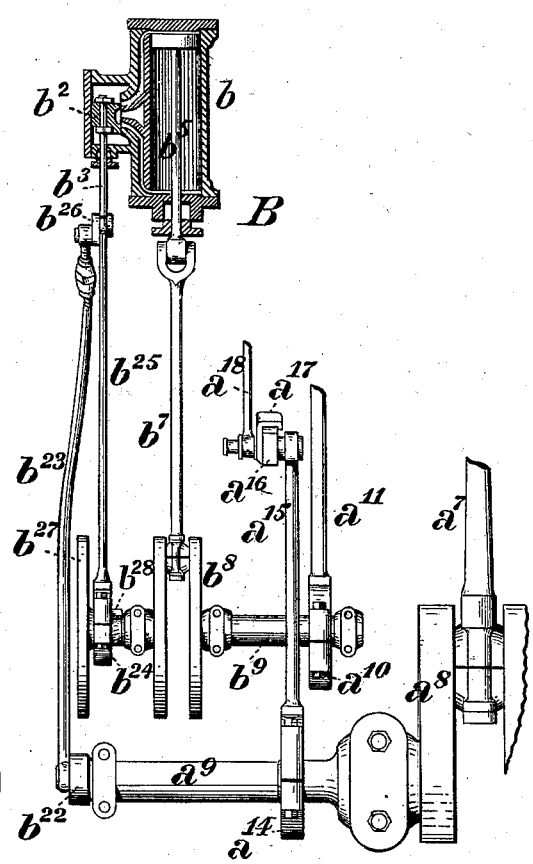
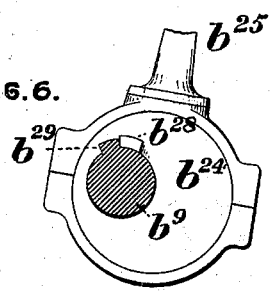
WITNESSES:
INVENTOR
Horace See,
by Collier & Bell,
attys (No Model.) 3 Sheets—Sheet 3.

H. SEE.
VALVE GEAR.

No. 263,818. Patented Sept. 5, 1882.

WITNESSES:
N. H. Culver
Geo. J. Kelly

INVENTOR
Horace See,
by Collier & Bell
attys.

ABELLA# UNITED STATES PATENT OFFICE.

HORACE SEE, OF PHILADELPHIA, PENNSYLVANIA.

VALVE-GEAR.

SPECIFICATION forming part of Letters Patent No. 263,818, dated September 5, 1882.

Application filed July 12, 1882. (No model.)

*To all whom it may concern:*

Be it known that I, HORACE SEE, of the city and county of Philadelphia, in the State of Pennsylvania, have invented certain new and useful Improvements in Valve-Gear for Steam-Engines, of which improvements the following is a specification.

My invention is an improvement upon that for which an application for Letters Patent of the United States was filed by me under date of May 9, 1882, (serial No. 60,871,) and has been allowed June 12, 1882.

The object of my present invention is to enhance the advantages, as to regularity of speed and facility of operating the valves, which are afforded by the invention set forth in my application aforesaid by admitting of the utilization of changes of speed of the main-engine shaft to correspondingly vary the admission of steam; also, to simplify and perfect the construction of a valve-engine adapted for reversing.

To these ends my improvements consist in the combination of a main engine, an auxiliary or subsidiary engine operating the distribution-valve of the main engine, and an independent cut-off valve governing the supply of steam to said main valve and operated from the shaft of the main engine; also, in the combination of a main engine and an auxiliary or subsidiary engine operating the distribution-valve of the main engine, and having its own distribution-valve operated by differential connection with its own shaft and with the shaft of the main engine, respectively; also, in the combination of a main engine, an auxiliary or subsidiary engine, and a pair of links operated respectively by eccentrics on the main and on the valve-engine shafts, and connected to opposite ends of a lever coupled intermediately to the distribution-valve of the valve-engine. The improvements claimed are hereinafter more fully set forth.

Figure 7:
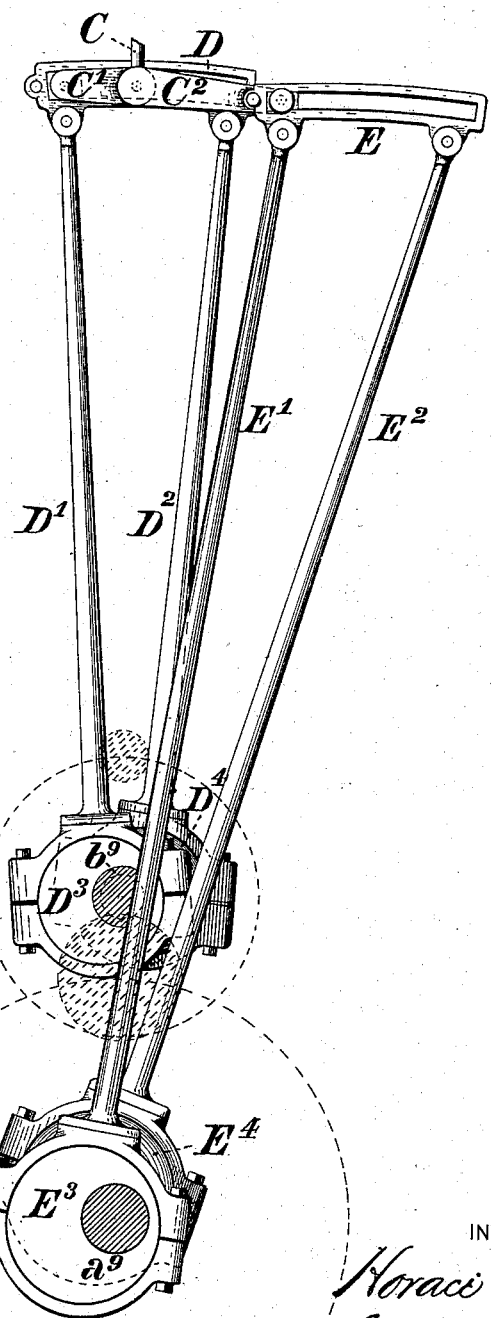

In the accompanying drawings, Figure 1 is a longitudinal central section through a steam-engine, illustrating an application of my invention, the same being arranged to run in one direction only; Fig. 2, a side view, in elevation, of the valve-gear thereof as seen from the left; Fig. 3, a longitudinal central section, showing a modification of the invention in which the valve-engine is fitted with differential-valve mechanism; Fig. 4, a side view, in elevation, of said valve mechanism as seen from the left; Fig. 5, a diagram illustrating the position of the parts when the cranks are on their lower centers; Fig. 6, a transverse section through the crank-shaft of the valve-engine, showing the construction of the eccentric thereof; Fig. 7, a view in elevation of a reversing mechanism embodying my invention, and Fig. 8 a plan or top view of the same.

Referring to Figs. 1 and 2, my invention is, as in my allowed application, (serial No. 60,871, before referred to,) shown as applied to a main engine, A, which is, *per se*, of the ordinary single-cylinder, double-acting, rotative class, having a cylinder, $a$, steam-chest $a'$, slide-valve $a^2$, valve-stem $a^3$, piston $a^4$, piston-rod $a^5$, cross-head $a^6$, connecting-rod $a^7$, crank $a^8$, and crank-shaft $a^9$, all of which may be of any approved construction. The main or distribution valve $a^2$ of the main engine is operated by an auxiliary, subsidiary, or valve engine, B, substantially similar in general construction to the main engine, but of smaller dimensions, said valve-engine embodying a double-acting cylinder, $b$, steam-chest $b'$, slide-valve $b^2$, valve-stem $b^3$, piston $b^4$, piston-rod $b^5$, cross-head $b^6$, connecting-rod $b^7$, crank $b^8$, crank-shaft $b^9$, eccentric $b^{10}$, and eccentric-rod $b^{11}$. The cranks $a^8$ of the main engine and $b^8$ of the valve-engine are set so that the movements of the two engines will be similar, and the eccentrics $b^{10}$ of the valve-engine and $a^{10}$ of the main engine are set in similar positions relatively to the cranks, the valve-engine eccentric $b^{10}$ being secured upon the shaft of the main engine, and the main-engine eccentric $a^{10}$ being secured upon the shaft of the valve-engine. The duty of the valve-engine being thus limited to the operation of the main or distribution valve of the main engine, the valve-engine works under a constant load and prevents the sudden changes of the speed of the main engine, which, under the ordinary construction, would be occasioned by sudden variations in the load of the latter.

So far as described the above construction accords with that set forth in my application (serial No. 60,871,) aforesaid to further improve which I reduce, as far as practicable, the disturbing influences of changes of speed of the main engine, due to variations of load or resistance, by applying, for the regulation of the admission of steam thereto, an independent cut-off valve, $a^{12}$, working on the back of the main valve $a^2$, and alternately covering and uncovering ports therein, which, in its movement, are brought into communication with the induction-passages of the cylinder. The cut-off valve $a^{12}$ is secured to a stem, $a^{13}$, connected to the rod $a^{15}$ of an eccentric, $a^{14}$, secured upon the shaft $a^9$ of the main engine. The connection of the cut-off valve and its eccentric is in this instance effected by the intermediation of a rod, $a^{18}$, which is coupled at one end to the cut-off valve stem $a^{13}$, and at the other to a block, $a^{17}$, which is adjustable by a rod, $a^{19}$, toward and from the fulcrum of a curved arm, $a^{16}$, which is pivoted at one of its ends to a fixed support, and is vibrated by being coupled to the rod $a^{15}$ of the cut-off eccentric $a^{14}$. The arrangement of the adjustable block $a^{17}$ and vibrating arm $a^{16}$, by which the travel of the cut-off valve may be varied as required for different grades of expansion, is not claimed by me as new or of my invention, and does not constitute any essential part thereof, as a cut-off valve adapted only to a fixed grade of expansion, or another mechanism for varying the degree thereof, may, if preferred, be employed.

It will be seen that under any grade of expansion at which the cut-off valve may be set to work an acceleration or a retardation of the speed of the main-engine shaft will, as in the ordinary construction, effect a corresponding diminution or increase, respectively, of the admission of steam through the ports of the main valve, which, as heretofore operated, would be correspondingly and coincidently affected by said variations of speed of the shaft. By the combination, however, under my invention, of a main valve which is driven at a substantially uniform speed with a cut-off valve subject to variations of speed the result is attained of rendering such variations of speed available for regulating the admission of steam in correspondence with the requirements of the work.

Figs. 3 to 6, inclusive, illustrate another application of the combined action of two shafts, one having uniform and the other variable speed, in the regulation of steam-supply. In this instance the distribution-valve $b^2$ of the valve-engine B is operated upon what is termed the "differential system," its stem $b^3$ being connected to one end of a link or bar, $b^{26}$, the opposite end of which is connected to a rod, $b^{23}$, which is coupled to an eccentric or crank, $b^{22}$, upon the main-engine shaft $a^9$. The link $b^{26}$ is coupled at a point between the valve-stem $b^3$ and the rod $b^{23}$ to the rod $b^{25}$ of an eccentric, $b^{24}$, upon the valve-engine shaft $b^9$, the link $b^{26}$ and valve $b^2$ being thus affected by and partaking of the movements of both the main and the valve engine shafts. The main engine being subject to an irregular and varying load, its tendency will be to drive its shaft at a faster or a slower speed in accordance with variations of load, while, as before stated, the tendency of the valve-engine is to drive its shaft at a substantially uniform speed. The effect of decrease of load upon the main-engine shaft will be to cause it to overrun the valve-engine shaft, and through the connection above described to coincidently reduce the admission of steam to the valve-engine by closing the valve thereof, and, similarly, upon an increase of load, to fall behind the valve-engine shaft and increase the admission of steam by earlier opening of its valve. The eccentric $b^{24}$ of the valve-engine shaft $b^9$ is loose thereon, and is formed in a piece with or secured to a hand-wheel, $b^{27}$, also loose thereon, rotation being imparted to the eccentric and hand-wheel by a key or driver, $b^{29}$, upon the shaft, abutting against a stop, $b^{28}$, on the eccentric. By the movement of the hand-wheel the eccentric may be turned ahead to admit an increased quantity of steam to the cylinder of the small engine, and moved backward within the limit of the stop to regulate such quantity as required.

Figure 8:
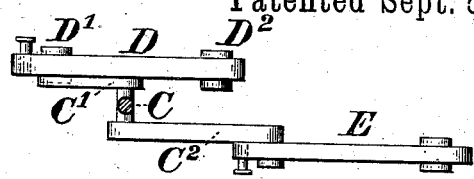

The construction shown in Figs. 7 and 8 exemplifies another means of regulating the operation of the distribution-valve of the valve-engine by the differential movements of the main and the valve engine shafts, and embodies the further advantage of presenting a convenient and desirable reversing mechanism. A pair of eccentrics, $E^3$ $E^4$, which may be termed the "driving-eccentrics" of the valve-engine, is secured upon the shaft $a^9$ of the main engine, and another pair of eccentrics, $D^3$ $D^4$, of similar throw, which may be termed the "reversing-eccentrics" of the valve-engine, is secured upon the shaft $b^9$ of the valve-engine. A stem, C, adapted to be connected to the valve-stem of the valve-engine, is formed upon a shaft having arms $C'$ $C^2$, projecting from it in opposite directions at substantially right angles to the stem C, and the arms $C'$ $C^2$ are coupled to blocks or dies fitting respectively in the slots of reversing-links D and E, the one, D, connected to the rods $D'$ $D^2$ of the reversing-eccentrics $D^3$ $D^4$, and the other, E, connected to the rods $E'$ $E^2$ of the driving-eccentrics $E^3$ $E^4$, each of the links having a pin upon it for the attachment of proper shifting-connections.

In operating the distribution-valve of the valve-engine in either direction the two links are moved into corresponding positions, and in reversing the motion of the main engine, as from ahead to back, the link E of the driving-eccentrics is first shifted into mid position. The link D of the reversing-eccentrics is then shifted into backing position, and finally the link E is likewise shifted into backing position. When running in either direction the reversing-link may either be set in mid position, leaving the entire duty of operating the valve to be performed by the driving-link, or both links may be employed for moving the valve.

It will be obvious that by the above construction a single distribution-valve suffices for the valve-engine in lieu of the two valves set forth in my former application.

I claim as my invention and desire to secure by Letters Patent—

1. The combination, substantially as set forth, of a main steam-engine, an auxiliary or valve engine driving a shaft which operates the main or distribution valve of the main engine, and an independent cut-off valve governing the admission of steam to said distribution-valve and operated by the shaft of the main engine.

2. The combination, substantially as set forth, of a main steam-engine and an auxiliary or valve engine, said auxiliary engine driving a shaft which operates the distribution-valve of the main engine, and having its own distribution-valve operated by a differential connection with its own shaft and with the shaft of the main engine, respectively.

3. The combination, substantially as set forth, of a main steam-engine and an auxiliary or valve engine, said auxiliary engine driving a shaft which operates the distribution-valve of the main engine, and having its own distribution-valve operated by connection with a pair of reversing-links which are moved respectively by eccentrics on the main and on the valve engine shafts.

4. The combination, substantially as set forth, of a main steam-engine and an auxiliary or valve engine having its distribution-valve operated by connection with a link or bar which is connected at different points in its length to a crank or eccentric on the main-engine shaft, and to an eccentric which is mounted loosely upon the valve-engine shaft, and is movable independently thereon by a hand-wheel within the limit imposed by a stop and driver.

5. In a steam-engine having its main or distribution valve operated by an auxiliary or valve engine, the combination, substantially as set forth, of a reversing-link connected to a pair of eccentrics fixed upon the main-engine shaft, a reversing-link connected to a pair of eccentrics secured upon the valve-engine shaft, and a stem adapted to be connected to the valve of the valve-engine, said stem having oppositely-projecting arms, each of which is coupled to a block or die fitting in one of said reversing-links.

HORACE SEE.

Witnesses:
J. SNOWDEN BELL,
GEO. T. KELLY.